United States Patent [19]

Harrison et al.

[11] 3,725,351

[45] Apr. 3, 1973

[54] FIBERS OF POLYESTERS PREPARED FROM ETHYLENE GLYCOL, DIMETHYL TEREPHTHALATE, SODIUM DIMETHYL-5-SULPHOISOPHTHALATE AND POLY(ETHYLENE OXIDE)

[75] Inventors: Albert Keith Harrison; John Mather, both of Harrogate, England

[73] Assignee: Imperial Chemical Industries Limited, London, England

[22] Filed: July 23, 1970

[21] Appl. No.: 64,052

Related U.S. Application Data

[63] Continuation of Ser. No. 783,423, Dec. 12, 1968, abandoned.

[52] U.S. Cl. ................260/75 S, 8/179, 260/33.4 P, 260/49
[51] Int. Cl. ..............................................C08g 17/14
[58] Field of Search..............................260/49, 75 S

[56] References Cited

UNITED STATES PATENTS 3,033,824   5/1962   Huffman ...............................260/75
3,557,039   10/1971  McIntyre et al. ....................260/29.2

FOREIGN PATENTS OR APPLICATIONS 12,149   8/1962   Japan ..................................260/75 S Primary Examiner—William H. Short
Assistant Examiner—L. L. Lee
Attorney—Leonard Horn and Stephen D. Murphy

[57] ABSTRACT

Fibers of copolyester of improved affinity for dyestuffs are derived from at least one dicarboxylic acid and at least 2 glycols, one of the glycols being a poly (alkylene oxide) and a proportion of the structural units of the copolyesters consists of organic radicals containing at least one sulphonate group as the metal salt.

2 Claims, No Drawings

FIBERS OF POLYESTERS PREPARED FROM ETHYLENE GLYCOL, DIMETHYL TEREPHTHALATE, SODIUM DIMETHYL-5-SULPHOISOPHTHALATE AND POLY(ETHYLENE OXIDE)

This application is a continuation of Ser. No. 783,423, filed Dec. 12, 1968, and now abandoned.

This invention relates to copolyesters of improved affinity towards basic dyestuffs.

According to the present invention we provide an improved, film or fiber-forming copolyester derived from at least one dicarboxylic acid and at least two glycols wherein one of the glycols is a poly(alkylene oxide) and of which a minor proportion of the structural units consists of organic radicals containing at least one sulphonate group in the form of the metal salt.

Suitable glycols other than poly(alkylene oxide) from which the copolyesters of our invention may be derived are, for example, $HO(CH_2)_nOH$ where $n$ is not less than 2 and not greater than 10 and 1:4-bis(hydroxymethyl) cyclohexane.

Preferably the copolyesters of our invention should contain in their molecule from one to 15 units derived from poly(alkylene oxide) per 100 total units.

By "minor proportion" we mean from one to 20 per 200.

The poly(alkylene oxide) from which the units are derived may have molecular weight from 500–20,000 but is preferably of molecular weight 500–6,000. Below a molecular weight of 500, the poly(alkylene oxide) is sufficiently volatile that it tends not to remain in the copolyester reaction mixture during reaction.

The copolyesters of our invention may be prepared by a variety of methods of which the following may be taken as examples:

a. The reaction of a dicarboxylic acid with a diol in the presence of a minor proportion of a sulphonated dicarboxylic acid or a sulphonated diol and a minor proportion of a poly(alkylene oxide).

b. The reaction of a copolyester containing sulphonated units with a poly(alkylene oxide).

c. The reaction of a copolyester containing poly(alkylene oxide) units with a sulphonated dicarboxylic acid or a sulphonated diol.

d. The melt-blending of a copolyester containing sulphonated units with a copolyester containing poly(alkylene oxide) units.

In general the metal salt of the sulphonate group should be that of an alkali metal or an alkaline earth metal, although other metals may be used. Preferably the sulphonate groups should be in the form of the metal salt during the polycondensation stage.

Particularly useful are copolyesters of which no less than 75 percent of the units are ethylene terephthalate units or are ethylene bis-1:2-(paracarboxyphenoxy)ethane units.

The copolyesters of our invention may additionally contain other additives commonly added to polyesters and in the amounts commonly used. In particular we have found the presence of an antioxidant and a stabilizer against adverse effects of irradiation to be beneficial.

The copolyesters of our invention may be processed to fibers by any known process. The fibers so formed have affinity towards basic dyestuffs superior to that of a copolyester containing sulphonated units but no poly(alkylene oxide) units and also superior to that of a copolyester containing poly(alkylene oxide) units but no sulphonated units, and that the extent of this superiority is greater than the additive effect expected for the individual factors, that is poly(alkylene oxide) and sulphonated units.

In order that the process of our invention should be the more fully understood, we give hereinafter examples of methods in which it may be put into practice. In these examples, all parts are by weight. By Viscosity Ratio we mean the ratio $\eta/\eta o$ where $\eta$ is the viscosity of the solution of polymer and $\eta o$ is the viscosity of the pure solvent. Determinations of Viscosity Ratio were carried out at 25° C in orthochlorophenol at a concentration of 1 g. of polymer to 100 ml. of solvent.

EXAMPLE 1

A mixture of dimethyl terephthalate (194 parts), ethylene glycol (155 parts) and manganese acetate (0.0486 parts) was heated at a temperature of 220° C for 1½ hours, after which time the theoretically obtainable quantity of methanol for full reaction had distilled off from the mixture. To the resultant reaction mixture there were added antimony trioxide (0.078 parts) and triphenyl phosphite (0.26 parts) and the resultant mixture heated for 3 hours at 284° C under an atmosphere of nitrogen at a pressure of 0.2 mm of mercury, under normal poly-condensation conditions. The resultant polyester had Viscosity Ratio 1.6, as determined as described hereinbefore.

A portion of the polyester so obtained was dried at 135° C for 3 hours, formed into a candle at 220° C and melt-spun into fibers. The resultant fibers were drawn over a pin at 85° C and a plate at 165° C, using a draw ratio of 4.0 to 1.

The drawn fiber (100 parts) was subjected to dyeing at 100° C for 1 hour in a dyebath of the composition:

| | |
|---|---|
| Dyestuff of Color Index Red 14 | 12.5 parts |
| Sodium sulphate | 600 parts |
| Water | 7,500 parts | and containing diphenyl (0.5 parts per 100 ml. of dye liquor) as carrier. Only a very weak shade of dyeing was obtained.

EXAMPLE 2

A copolyester was prepared by following the procedure of Example 1 exactly, with the distinction that immediately prior to the polycondensation stage there were added to the reaction mixture sodium dimethyl-5-sulphoisophthalate (5.92 parts) and poly(ethylene oxide) of molecular weight 1540 (9.7 parts). The resultant copolyester therefore contained sulphonate-bearing structural units and poly(ethylene oxide) units. The resultant copolyester was spun and drawn as described in Example 1 and subjected to the same dyeing conditions with the same dyestuff. A deep shade of dyeing was obtained.

EXAMPLE 3

Comparative experiments were carried out adding on the one hand dimethyl-5-sulphoisophthalate (5.92 parts) only and adding poly(ethylene oxide) of molecular weight 1540 (9.7 parts) only. These experiments showed that the fibers of Example 2 had greater affinity towards the basic dyestuff than would be expected from the additive effect of linkages derived from dimethyl-5-sulphoisophthalate and those derived from poly(alkylene oxide), showing a synergistic effect of the two factors.

We claim:

1. A fiber whose fiber-forming material consists of the product of the process of reacting ethylene glycol and dimethyl terephthalate under ester-interchange conditions to form poly(ethylene terephthalate) prepolymer, thereafter adding to this prepolymer poly(ethylene oxide) with a molecular weight of from about 500 to about 6000 and sodium dimethyl-5-sulphoisophthalate, and thereafter polycondensing said reaction mixture, whereby a copolyester is formed wherein at least 75 percent of the recurring structural units are ethylene terephthalate units, from 0.5 to 10 structural units per 100 total structural units are organic radicals derived from said sulphoisophthalate, and from 1 to 15 structural units per 100 total structural units are organic radicals derived from said poly (ethylene oxide).

2. The fiber of claim 1, wherein said poly(ethylene oxide) has a molecular weight of about 1540.

* * * * *